US007217189B2

(12) United States Patent
Kaminkow

(10) Patent No.: US 7,217,189 B2
(45) Date of Patent: May 15, 2007

(54) GAMING DEVICE HAVING A ROTATABLE MECHANICAL AWARD INDICATOR PARTIALLY COVERED BY A MASK

(75) Inventor: Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/896,437

(22) Filed: Jul. 21, 2004

(65) Prior Publication Data

US 2005/0026678 A1 Feb. 3, 2005

Related U.S. Application Data

(60) Provisional application No. 60/490,879, filed on Jul. 29, 2003.

(51) Int. Cl.
*A63F 9/24* (2006.01)
*A63F 13/00* (2006.01)

(52) U.S. Cl. .......................................... 463/20; 463/21

(58) Field of Classification Search ..................... None
See application file for complete search history.

(56) References Cited

U.S. PATENT DOCUMENTS

| | | | |
|---|---|---|---|
| 1,978,395 | A | 10/1934 | Groetchen |
| 2,077,124 | A | 4/1937 | Miller et al. |
| 3,420,525 | A | 1/1969 | Waders |
| 3,642,287 | A | 2/1972 | Lally et al. |
| 3,645,531 | A | 2/1972 | Wright |
| 3,735,987 | A | 5/1973 | Ohki |
| 4,198,052 | A | 4/1980 | Gauselmann |
| 4,326,351 | A | 4/1982 | Heywood et al. |
| 4,346,900 | A | 8/1982 | Lamlee |
| 4,448,419 | A | 5/1984 | Telnaes |
| 4,492,378 | A | 1/1985 | Williams |
| 4,695,053 | A | 9/1987 | Vazquez, Jr. et al. |
| 4,826,169 | A | 5/1989 | Bessho et al. |
| 5,152,529 | A | 10/1992 | Okada |
| 5,184,821 | A | 2/1993 | Korenek |
| 5,188,363 | A | 2/1993 | Marnell, II et al. |
| 5,259,616 | A | 11/1993 | Bergmann |

(Continued)

FOREIGN PATENT DOCUMENTS

DE 19873709026 9/1988

(Continued)

OTHER PUBLICATIONS

Austin Powers in Goldmember™ Advertisement written by IGT, published in 2003.

(Continued)

*Primary Examiner*—Corbett B. Coburn
(74) *Attorney, Agent, or Firm*—Bell, Boyd & Lloyd LLP

(57) ABSTRACT

A gaming device including a rotatable mechanical award indicator which has a plurality of award symbols. The gaming device includes a mask, preferably overlaying the mechanical award indicator, which reveals only a predetermined number of the award symbols. In one embodiment, the gaming device includes a plurality of player selectable symbols associated with different movements of the mechanical award indicator. This type of gaming device adds excitement to bonus games and increases player entertainment.

30 Claims, 7 Drawing Sheets

U.S. PATENT DOCUMENTS

| | | | |
|---|---|---|---|
| 5,292,127 A | 3/1994 | Kelly et al. | |
| 5,364,100 A | 11/1994 | Ludlow et al. | |
| 5,395,111 A | 3/1995 | Inoue | |
| 5,536,016 A | 7/1996 | Thompson | |
| 5,553,851 A | 9/1996 | Malavazos et al. | |
| 5,580,309 A | 12/1996 | Piechowiak et al. | |
| 5,584,763 A | 12/1996 | Kelly et al. | |
| 5,584,764 A | 12/1996 | Inoue | |
| 5,639,089 A | 6/1997 | Matsumoto et al. | |
| 5,647,798 A | 7/1997 | Falciglia | |
| D392,340 S | 3/1998 | DeSimone | |
| 5,752,881 A | 5/1998 | Inoue | |
| 5,755,619 A | 5/1998 | Matsumoto et al. | |
| 5,775,692 A | 7/1998 | Watts et al. | |
| 5,788,573 A | 8/1998 | Baerlocher et al. | |
| 5,823,874 A | 10/1998 | Adams | |
| 5,848,932 A | 12/1998 | Adams | |
| 5,879,235 A | 3/1999 | Kaneko et al. | |
| 5,882,261 A | 3/1999 | Adams | |
| 5,911,418 A | 6/1999 | Adams | |
| D412,347 S | 7/1999 | DeSimone et al. | |
| 5,947,820 A | 9/1999 | Morro et al. | |
| 5,951,397 A * | 9/1999 | Dickinson | 463/36 |
| 5,980,384 A | 11/1999 | Barrie | |
| 5,984,782 A | 11/1999 | Inoue | |
| 6,004,207 A * | 12/1999 | Wilson et al. | 273/143 R |
| 6,015,346 A | 1/2000 | Bennett | |
| 6,027,115 A | 2/2000 | Griswold et al. | |
| 6,033,307 A | 3/2000 | Vancura | |
| 6,039,649 A | 3/2000 | Schulze | |
| 6,039,976 A | 3/2000 | Mehra et al. | |
| 6,059,289 A | 5/2000 | Vancura | |
| 6,059,658 A | 5/2000 | Mangano et al. | |
| 6,082,734 A | 7/2000 | Uehara et al. | |
| 6,086,066 A | 7/2000 | Takeuchi et al. | |
| 6,089,976 A | 7/2000 | Schneider et al. | |
| 6,089,978 A | 7/2000 | Adams | |
| 6,095,921 A | 8/2000 | Walker et al. | |
| 6,102,798 A | 8/2000 | Bennett | |
| 6,105,962 A | 8/2000 | Malavazos et al. | |
| 6,117,009 A | 9/2000 | Yoseloff | |
| 6,142,873 A | 11/2000 | Weiss et al. | |
| 6,149,156 A | 11/2000 | Faela | |
| 6,159,095 A | 12/2000 | Frohm et al. | |
| 6,159,098 A | 12/2000 | Slomiany et al. | |
| 6,162,121 A | 12/2000 | Morro et al. | |
| 6,168,520 B1 | 1/2001 | Baerlocher et al. | |
| 6,174,235 B1 | 1/2001 | Walker et al. | |
| 6,190,255 B1 | 2/2001 | Thomas et al. | |
| 6,217,022 B1 | 4/2001 | Astaneha | |
| 6,224,483 B1 | 5/2001 | Mayeroff | |
| 6,231,442 B1 | 5/2001 | Mayeroff | |
| 6,302,790 B1 | 10/2001 | Brossard | |
| 6,309,299 B1 | 10/2001 | Weiss | |
| 6,309,300 B1 | 10/2001 | Glavich | |
| 6,315,664 B1 | 11/2001 | Baerlocher | |
| 6,316,663 B1 | 11/2001 | Sakamoto | |
| 6,319,124 B1 | 11/2001 | Baerlocher et al. | |
| 6,322,309 B1 | 11/2001 | Thomas et al. | |
| 6,334,814 B1 | 1/2002 | Adams | |
| 6,336,863 B1 | 1/2002 | Baerlocher et al. | |
| 6,343,988 B1 | 2/2002 | Walker et al. | |
| 6,364,767 B1 | 4/2002 | Brossard et al. | |
| 6,375,187 B1 | 4/2002 | Baerlocher | |
| 6,386,974 B1 | 5/2002 | Adams | |
| 6,398,220 B1 | 6/2002 | Inoue | |
| 6,439,995 B1 | 8/2002 | Hughs-Baird | |
| D462,397 S | 9/2002 | Baker et al. | |
| 6,464,582 B1 | 10/2002 | Baerlocher et al. | |
| 6,506,117 B2 | 1/2003 | DeMar et al. | |
| 6,506,118 B1 | 1/2003 | Baerlocher et al. | |
| D473,270 S | 4/2003 | Seelig et al. | |
| 6,572,473 B1 | 6/2003 | Baerlocher | |
| 6,589,114 B2 | 7/2003 | Rose | |
| 6,659,864 B2 | 12/2003 | McGahn et al. | |
| 6,676,512 B2 | 1/2004 | Fong et al. | |
| 6,726,204 B2 | 4/2004 | Inoue | |
| 2002/0072402 A1 | 6/2002 | Baerlocher | |
| 2002/0142822 A1 | 10/2002 | Baerlocher et al. | |
| 2002/0183109 A1 | 12/2002 | McGahn et al. | |
| 2003/0027623 A1 | 2/2003 | Rose et al. | |
| 2003/0040360 A1 | 2/2003 | Kaminkow | |
| 2003/0078093 A1 | 4/2003 | Simms | |
| 2003/0078096 A1 | 4/2003 | Kaminkow | |
| 2003/0119583 A1 | 6/2003 | Kaminkow et al. | |
| 2003/0162578 A1 | 8/2003 | Baerlocher et al. | |
| 2003/0162579 A1 | 8/2003 | Gauselmann | |
| 2003/0162584 A1 | 8/2003 | Hugh-Baird | |
| 2003/0195027 A1 | 10/2003 | Baerlocher et al. | |
| 2004/0012145 A1 | 1/2004 | Inoue | |
| 2004/0014516 A1 | 1/2004 | Inoue | |
| 2004/0014517 A1 | 1/2004 | Inoue | |
| 2004/0018866 A1 | 1/2004 | Inoue | |
| 2004/0026854 A1 | 2/2004 | Inoue | |
| 2004/0036218 A1 | 2/2004 | Inoue | |
| 2004/0038726 A1 | 2/2004 | Inoue | |

FOREIGN PATENT DOCUMENTS

| | | |
|---|---|---|
| EP | 1 184 822 A3 | 3/2002 |
| EP | 1 653 416 | 5/2006 |
| GB | 2042782 A * | 9/1980 |
| GB | 2 062 922 A | 5/1981 |
| GB | 2062922 A * | 5/1981 |
| GB | 2 090 690 A | 7/1982 |
| GB | 2 096 376 A | 10/1982 |
| GB | 2 097 160 A | 10/1982 |
| GB | 2 100 905 A | 1/1983 |
| GB | 2 105 891 A | 3/1983 |
| GB | 2 117 155 A | 10/1983 |
| GB | 2 137 392 A | 10/1984 |
| GB | 2 161 008 A | 1/1986 |
| GB | 2 170 636 A | 8/1986 |
| GB | 2 181 589 A | 4/1987 |
| GB | 2 183 882 A | 6/1987 |
| GB | 2 191 030 A | 12/1987 |
| GB | 2 222 712 A | 3/1990 |
| GB | 2 225 889 A | 6/1990 |
| GB | 2 226 436 A | 6/1990 |
| GB | 2 242 300 A | 9/1991 |
| GB | 2 262 642 A | 6/1993 |
| GB | 2 322 217 | 12/1997 |
| GB | 2 201 821 | 9/1998 |
| WO | WO 00/12186 | 3/2000 |
| WO | WO 00/32286 | 6/2000 |

OTHER PUBLICATIONS

Barn Yard Article written by Strictly Slots, published in Mar. 2002.

Barn Yard Advertisement written by Aristocrat, not dated.

Description of Let's Make a Deal Television Show written by letsmakeadeal.com (2 pages), printed on Mar. 16, 2001.

Gold Fever Advertisement written by Atronic Casino Technology, Ltd., published 1999.

Gold Fever Atronic Web Page written by Atronic Casino Technology, Ltd., dated Mar. 2002.

Jewel in the Crown Advertisement written by IGT, published in 1999.

Let's Make a Deal Game Advertisement written by Bally Gaming Systems, not dated.

Let's Make a Deal geocities.com (2 pages), printed on Mar. 16, 2001.

Let's Make a Deal written by fortunecity.com (4 pages), printed on Mar. 21, 2001.

Let's Make a Deal written by geocities.com (10 pages), printed on Mar. 21, 2001.
Let'Make a Deal written by Illinoislottery.com (1 page), printed on Mar. 21, 2001.
Marshall Fey, Slot Machines a pictorial History of the First 100 Years, Fifth Edition.
Easy Street Article written by Strictly Slots, published in Jul. 2000.
Take Your Pick Article and Brochure, written by Strictly Slots, IGT/Anchor Games, published in 1999.
The Deals of Let's Make a Deal written by fortunecity.com (2 pages), printed on Jul. 20, 2004.
The Official Let's Make a Deal Website written by Bally Gaming System Website, printed on Mar. 16, 2001.
Top Dollar Brochure, written by IGT, published in 1998.
Wheel of Fortune Brochure, written by IGT, published in 1998.
Wheel of Fortune Brochure, written by IGT, published in 1999.

* cited by examiner

FIG. 3

| SELECTION SYMBOL | MOVE INDICATOR (128) | P (130) | MOVE SPECIFICATION (132) | SELECTION SYMBOL | MOVE INDICATOR (128) | P (130) | MOVE SPECIFICATION (132) | SELECTION SYMBOL | MOVE INDICATOR (128) | P (130) | MOVE SPECIFICATION (132) |
|---|---|---|---|---|---|---|---|---|---|---|---|
| 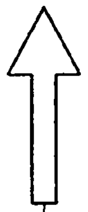 126a | 2⇧ | 10% | TWO MOVES UPWARD | 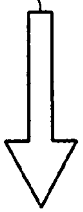 126b | 2⇩ | 60% | TWO MOVES DOWNWARD | 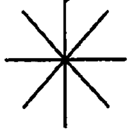 126c | 8⇧ | 5% | EIGHT MOVES UPWARD |
| | 3⇧ | 30% | THREE MOVES UPWARD | | 3⇩ | 10% | THREE MOVES DOWNWARD | | 6⇧ | 15% | SIX MOVES UPWARD |
| | 4⇧ | 10% | FOUR MOVES UPWARD | | 4⇩ | 10% | FOUR MOVES DOWNWARD | | 2⇩ | 30% | TWO MOVES DOWNWARD |
| | 5⇧ | 50% | FIVE MOVES UPWARD | | 5⇩ | 20% | FIVE MOVES DOWNWARD | | 9⇩ | 50% | NINE MOVES DOWNWARD |
| 126d 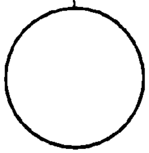 | Ø | 30% | NO MOVES | 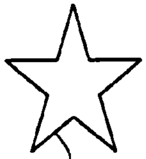 126e | 10⇧ | 50% | TEN MOVES UPWARD | 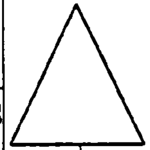 126f | 1⇧ | 10% | ONE MOVE UPWARD |
| | 25⇧ | 20% | TWENTY-FIVE MOVES UPWARD | | 12⇧ | 10% | TWELVE MOVES UPWARD | | 2⇩ | 10% | TWO MOVES DOWNWARD |
| | 30⇩ | 40% | THIRTY MOVES DOWNWARD | | 20⇧ | 10% | TWENTY MOVES UPWARD | | 5⇩ | 40% | FIVE MOVES DOWNWARD |
| | 10⇩ | 10% | TEN MOVES DOWNWARD | | 8⇩ | 30% | EIGHT MOVES DOWNWARD | | 15⇩ | 40% | FIFTEEN MOVES DOWNWARD |

GAMING DEVICE HAVING A ROTATABLE MECHANICAL AWARD INDICATOR PARTIALLY COVERED BY A MASK

PRIORITY CLAIM

This application is a non-provisional of, claims priority to and the benefit of U.S. Provisional Application Ser. No. 60/490,879, filed Jul. 29, 2003, the entire contents of which are incorporated herein.

CROSS REFERENCE TO RELATED APPLICATIONS

This application relates to the following co-pending, commonly owned application: "GAMING DEVICE HAVING A DISPLAY DEVICE HAVING MULTIPLE ROTATABLE MEMBERS," Ser. No. 11/470,167.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and more particularly to a wagering gaming device having a rotatable mechanical award indicator partially covered by a mask.

Certain gaming machines include a primary or base game and a secondary or bonus game. A common primary game such as a slot game includes rotatable reels. Typically, a bonus game begins when a predetermined symbol or symbol combination is generated on the reels. The bonus game provides the player with an opportunity to gain one or more bonus values or awards.

One known bonus game involves a mechanical wheel. The wheel is attached to the top of the gaming device cabinet and is divided into several pie-shaped sections. Each section includes an award which ranges in value from twenty-five to one thousand. All of the award values are visible to the player at all times. When the bonus game is triggered, the player causes the wheel to spin by pressing a play button. When the wheel stops spinning, an indicator points to a section of the wheel. The player receives the award displayed on that section.

In this bonus game, the player cannot affect the direction in which the wheel spins, nor can the player affect to what extent the wheel rotates before stopping. Furthermore, this bonus game does not include a mask which masks one or more of the sections or values. To increase player enjoyment and excitement, it is desirable to provide players with new wagering gaming devices including new games such as primary and secondary games.

SUMMARY OF THE INVENTION

The gaming device of the present invention, in one embodiment, includes: (a) a rotatable mechanical award indicator such a mechanical wheel or reel, which includes a plurality of awards symbols such as bonus values; (b) a suitable actuator or motor which drives the mechanical award indicator; and (c) a panel or mask which preferably partially overlays the mechanical award indicator.

The mask includes any suitable cover or surface which allows a player to view one or more (but not all) of the award symbols. In one embodiment, the mask includes a panel which defines an opening or window positioned adjacent to the mechanical award indicator. The mask is opaque in one embodiment and the window can include a fully or partially transparent surface, a fully or partially translucent surface, an opening, a slot or hole or a series of openings, slots or holes. In one embodiment, the window includes a transparent plastic window constructed within the body of the mask.

In one embodiment, the award symbols are fixed. In other embodiments, the award symbols may change, such as in each iteration of the play of the game. In an alternative embodiment, the award indicator is a video display which is operable to display the award symbols.

In one embodiment, the game includes a plurality of selections or selection symbols. Each of the selection symbols is preferably associated with: (a) one or more move indicators; (b) one or more probabilities; and (c) one or more move specifications. The move specifications may be fixed or predetermined, or randomly determined. When the player selects one of the selection symbols, the actuator or motor drives the mechanical award indicator to a position. The particular position at which the mechanical award indicator stops, depends on which selection symbol the player chooses.

When the mechanical award indicator stops rotating, the window reveals one award symbol. The gaming device can provide the player with an award associated with this award symbol. This can be repeated a designated number of times for each of a designated number of picks of selections by the player. In an alternative embodiment, the gaming device can provide the player with an opportunity to accept or reject an award associated with this award symbol for each of a designated number of picks of the selections. If the player accepts an award, the game ends.

In one alternative embodiment, the gaming device does not include any selection symbols. Instead, when a predetermined game event occurs, or when the player makes a predetermined input, the mechanical award indicator rotates and stops, and the window reveals a set of award symbols to the player. The gaming device enables the player to accept or reject this set. Once the player accepts a set, the gaming device indicates one of the awards symbols in that set to the player. The gaming device then provides the player with an award associated with the indicated award symbol.

In one embodiment, the gaming device of the present invention includes a mechanical award indicator which includes a rotatable mechanical object such as a reel having a plurality of award symbols. A cover and window combination or a mask overlays the rotatable object, thereby masking a predetermined number of award symbols from the player's view. In one embodiment, the mechanical award indicator provides the player with the opportunity to gain award values displayed on the rotatable mechanical object. When a particular event occurs, the gaming device rotates the mechanical reel, reveals a value to the player and awards that value to the player. In another embodiment, the gaming device provides the player with a predetermined number of opportunities to accept or reject award values revealed to the player. Various alternative methods for providing players awards are contemplated by the present invention.

It is therefore an advantage of the present invention to provide a gaming device having a rotatable mechanical award indicator at least partially covered by a mask.

Another advantage of the present invention is to provide a gaming device having a primary game or bonus game which involves a mechanical wheel or reel at least partially covered by a mask which reveals certain award values to players.

Another advantage of the present invention is to provide a gaming device including a mechanical award indicator whose direction of movement and/or magnitude of movement can be affected by the player.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 3 is a table illustrating a plurality of selection symbols and a plurality of move indicators, probabilities and move specifications associated with the selection symbols.

DETAILED DESCRIPTION OF THE INVENTION

Gaming Device Structure and Electronic Configuration

Figure 1:
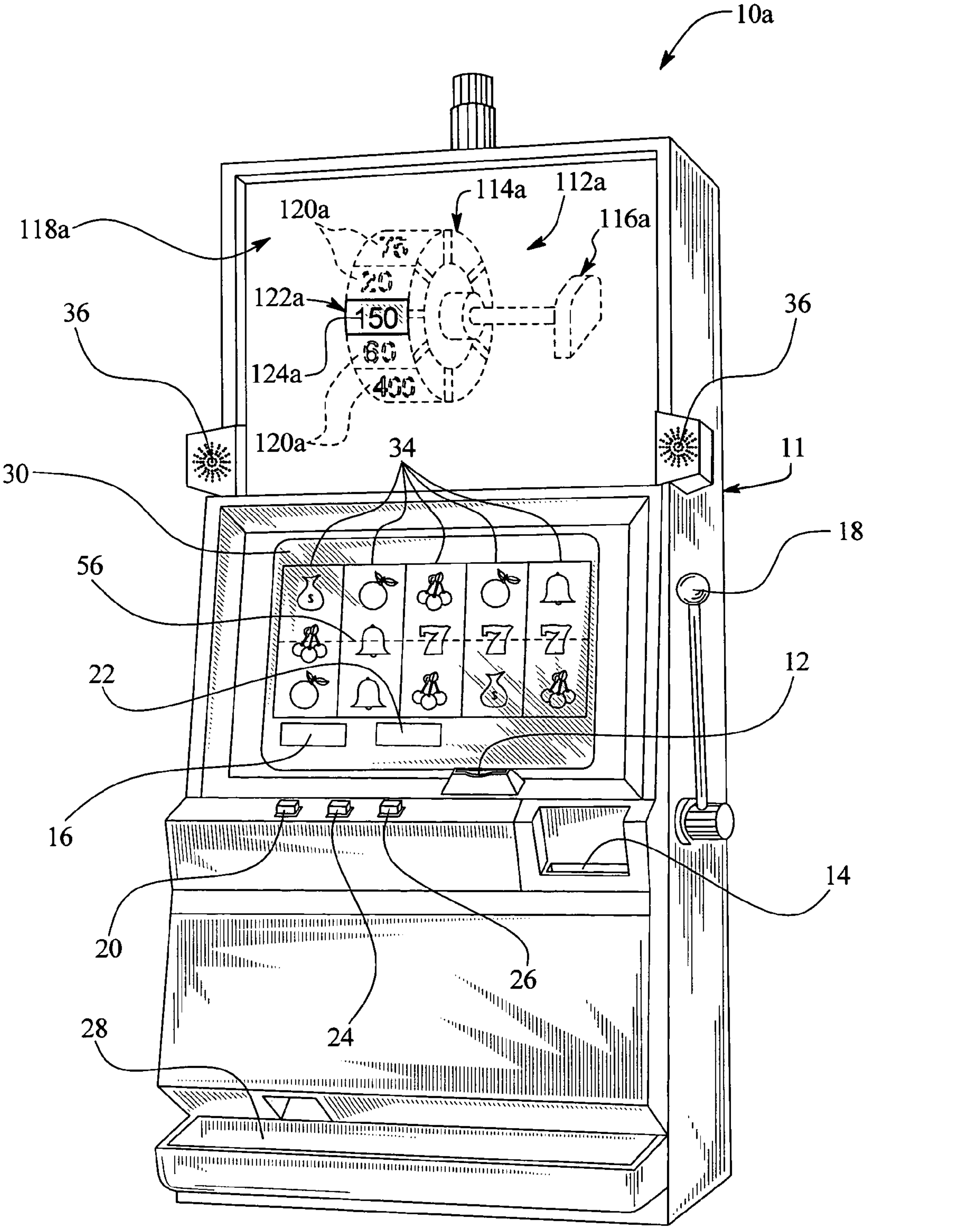
FIG. 1 is a perspective view of one embodiment of the gaming device of the present invention illustrating a vertically mounted mechanical reel and one player visible bonus value on the reel.

Referring now to FIGS. 1 to 7, gaming devices 10*a*, 10*b*, 10*c* and 10*d* include the mechanical award indicators 112*a*, 112*b*, 112*c* or 112*d*, respectively, as described below. In one embodiment, gaming devices 10*a* to 10*d*, generally referred to as gaming device 10, is a slot machine having the controls, displays and features of a conventional slot machine. It is constructed so that a player can operate it while standing or sitting. It should be appreciated that gaming device 10 can be constructed as a pub-style table-top game (not shown) which a player can operate preferably while sitting. Furthermore, gaming device 10 can be constructed with varying cabinet 11 and display designs, as illustrated by the designs shown in FIGS. 1, 2 and 4 to 6. Gaming device 10 can incorporate any suitable primary game such as slot, poker or keno, any of their suitable bonus triggering events and any of their suitable bonus round games. The symbols and indicia used on and in gaming device 10 may be in mechanical, electrical or video form.

As illustrated in FIGS. 1, 2 and 4 to 6, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

Gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIGS. 1, 2 and 4 includes a central display device 30, and the alternative embodiment shown in FIG. 5 includes a central display device 30 as well as an upper display device 32. Gaming device 10 may display a plurality of reels 34, such as three to five reels 34 in mechanical or video form at one or more of the display devices. A display device can be any viewing surface such as glass, a video monitor or screen, a liquid crystal display or any other display mechanism.

If the reels 34 are in video form, the display device for the video reels 34 is preferably a video monitor. Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 7:
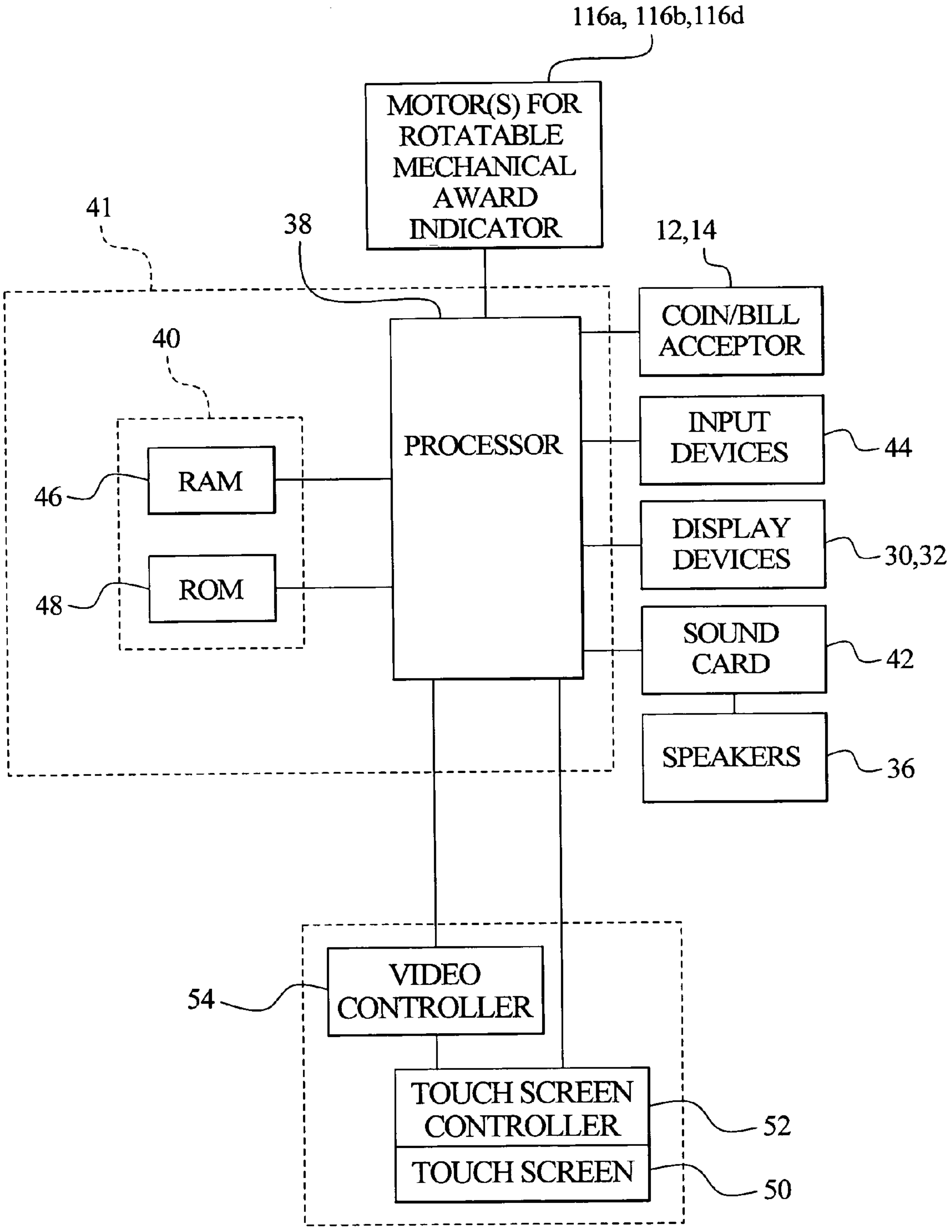
FIG. 7 is a schematic view of the electronic configuration of the gaming device in one embodiment of the present invention.

As illustrated in FIG. 7, the general electronic configuration of gaming device 10 preferably includes: a processor 38; a memory device 40 for storing program code or other data; one or more motors 116*a*, 116*b* or 116*d*; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards.

Preferably, the memory device 40 stores the random generator program described below as well as the values and associated probabilities and move specifications described below. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

The player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 7, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a data network 41 or network server for communication to a playing station such as over a local area network (LAN), wide area network (WAN), Internet connection, microwave link, and the like. In addition, the gaming device processor 38 can communicate with a server over a data network 41. For example, the processor 38 can exchange game data with a gaming facility server by communicating with such server over a gaming facility network. The processor 38 and memory device 40 is generally referred to herein as the computer or controller.

To generally operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round, as illustrated in FIGS. 1 to 6. This type of gaming device 10 will include a program which will automatically begin a bonus round when the player has achieved a qualifying condition in the game. This qualifying condition can be a particular arrangement of indicia on a display device. The gaming device 10 preferably uses one of the award indicators 112*a*, 112*c* or 112*d* to play the bonus round. Preferably, the qualifying condition is a predetermined combination of indicia appearing on a plurality of reels 34. As illustrated in the five reel slot game shown in FIGS. 1, 5 and 6, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Mechanical Award Indicator

Figure 2:
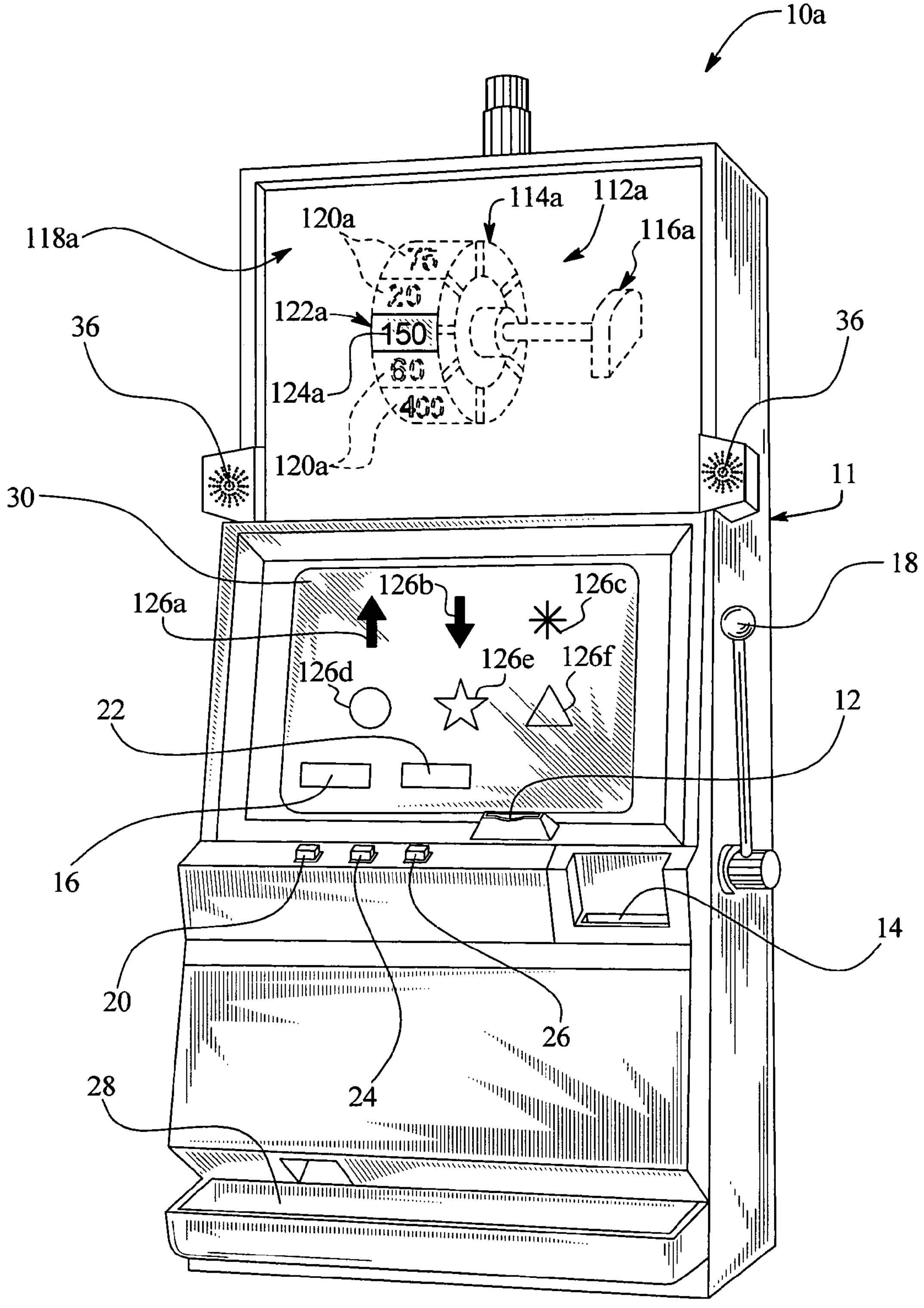
FIG. 2 is a perspective view of the gaming device shown in FIG. 1 illustrating a plurality of selection symbols in a bonus game and a vertically mounted mechanical reel revealing one bonus value.

In one embodiment illustrated in FIGS. 1 to 3, the mechanical award indicator 112*a* includes: (a) a mechanical reel 114*a* which is coupled to and driven by an actuator such as a motor 116*a*; and (b) a panel or mask 118*a* which preferably overlays the mechanical reel 114*a*. The mechanical reel 114*a* includes a plurality of award symbols such as bonus values 120*a*. The bonus values 120*a* are preferably affixed to the mechanical reel 114*a* in a mechanical fashion, such as in the form of paint or decals. It should be appreciated, however, that the bonus values 120*a* can additionally or alternatively be formed with one or more suitable electrical light sources.

In one embodiment, the mask 118*a* includes any suitable cover or surface which enables a player to only view one of the bonus values and in another embodiment to view more then one (but not all) of the bonus values 120*a* which would otherwise be visible to the player. In one embodiment, the mask 118*a* includes a panel which generally covers the upper portion of the gaming device 10*a*. Here, the mask 118*a* defines a window 122*a* positioned adjacent to the mechanical reel 114*a*. The position of one of the values 120*a* facing the front of the gaming device 10*a* can be aligned with the position of the window 122*a*. In the example shown in FIGS. 1 and 2, the bonus value 124*a* has a position aligned with the position of the window 122*a*. Accordingly, although the mechanical reel 114*a* bears a plurality of bonus values 120*a*, in the illustrated embodiment the player can only view the bonus value 124*a*.

When a player reaches a predetermined event or bonus triggering event while playing the primary game, the bonus game begins. In one embodiment, the bonus game includes a plurality of selection symbols 126*a* to 126*f*. Each of the selection symbols 126*a* to 126*f* is preferably associated with: (a) one or more move indicators 128; (b) one or more probabilities 130; and (c) one or more move specifications 132, as illustrated in FIG. 3.

The move indicators 128, which can include any suitable symbols, preferably inform the player about the move specifications 132 associated with the selection symbols 126*a* to 126*f*. The probabilities 130 include the mathematical probability that the player will reach a particular move specification 132 by selecting a particular selection symbol 126*a* to 126*f*. Accordingly, one or more, and preferably each of the bonus values 120*a* is associated with: (a) a selection symbol 126*a* to 126*f*; (b) one or more move indicators 128; (c) one or more probabilities 130; and (d) one or more move specifications 132. In one embodiment, the average expected value to be gained by the player can thus be determined for each of the selection symbols 126*a* to 126*f* by using a suitable calculation based upon such probabilities and the award values.

The player can select one or more of the selection symbols 126*a* to 126*f* by activating a suitable input device. Preferably, when the player presses a predetermined input button 120, the motor 116*a* drives the mechanical reel 114*a* causing the reel to make a predetermined rotation. The rotation begins at a predetermined start position and ends at a predetermined stop position. When the reel 114*a* stops rotating at the stop position, a bonus value 120*a* is displayed through the window 122*a*. The gaming device can automatically award the player with the displayed bonus value 124*a*, or in an alternative embodiment enable the player to accept or reject this value. If the player rejects this value, the player may chose another selection symbol 126*a* to 126*f*. In one embodiment, if the player accepts this value, the player can still choose another selection symbol 126*a* to 126*f*. This process can repeat itself a predetermined number of times. In another embodiment, if the player accepts a displayed value, the bonus game terminates. The number of picks of the selections can be determined in any suitable manner. It should thus be appreciated that the player may obtain one award or a plurality of awards.

Regardless of the particular embodiment, the bonus game continues until the player reaches a termination condition. A termination condition can occur when the mechanical reel 114*a* has made a predetermined number of rotations, when a player has accepted or been awarded with a predetermined amount of values, when a player has rejected a predetermined number of bonus values, when the mechanical reel 114*a* stops and the window 122*a* displays a termination symbol, or when any other predetermined event occurs. Once the bonus game terminates, the gaming device awards the player with the values the player has gained.

In another embodiment, the bonus game includes a set or pool of different selection symbols, and each selection symbol is associated with a different move specification. Upon the initiation of each bonus game, the gaming device processor randomly generates or selects a predetermined number of the selection symbols from this pool. For example, the pool may include one hundred different selection symbols. The gaming device processor may use a suitable random number generator program to randomly select five of these selection symbols. The gaming device then displays these selection symbols, enables the player to select one or more of the displayed selection symbols and rotates the mechanical wheel in accordance with the move specifications associated with the selection symbols selected by the player.

In another embodiment, the bonus game includes a predetermined number of selection symbols. These same selection symbols, each associated with a move specification, are displayed on the display device for each game. The bonus values on the mechanical reel or wheel are formed through one or more electrical light sources. When the player selects a selection symbol, the gaming device uses a random number generator program to produce a bonus value for a particular position on the mechanical reel or wheel. The gaming device then causes the light source at that position to form such value. This prevents the player from controlling the payout by memorizing the moves associated with the selection symbols.

Figure 4:
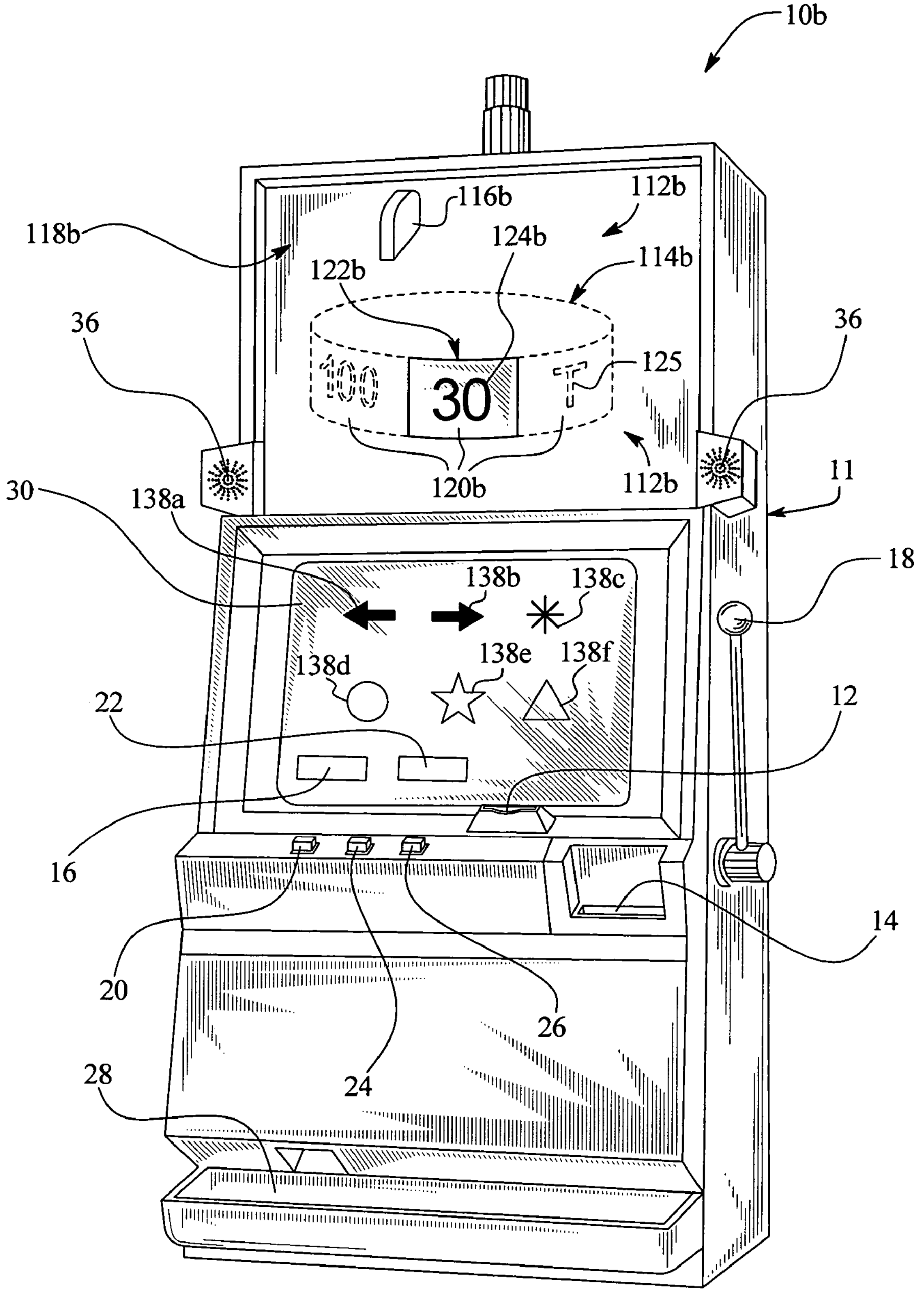
FIG. 4 is a perspective view of one embodiment of the gaming device of the present invention illustrating a plurality of selection symbols in a primary game and a horizontally mounted mechanical reel revealing one value.

In another embodiment illustrated in FIG. 4, the gaming device 10*b* includes the mechanical award indicator 112*b*. Mechanical award indicator 112*b* includes: (a) a mechanical reel 114*b* coupled to and driven by the motor 116*b*; and (b) a panel of mask 118*b* which preferably overlays the mechanical reel 114*b*. The mechanical reel 114*b* is mounted horizontally within cabinet 11. From this illustration, it should be appreciated that the rotatable mechanical object of the present invention can be mounted in various positions, including, without limitation, in the cabinet 11 or as part of a topper on top of the cabinet 11 in vertical, horizontal, diagonal or other positions or orientations.

In this embodiment, the primary game includes a plurality of selection symbols 138*a* to 138*f*. During the primary game, the gaming device processor enables the player to select one or more of the selection symbols 138*a* to 138*f*. Each of the selection symbols 138*a* to 138*f* is associated with a move specification. When the player selects one of the selection symbols 138*a* to 138*f*, the gaming device processor causes the motor 116*b* to move the mechanical reel 114*b* in accordance with the move specification associated with such selection symbol.

It should be appreciated that the move specifications can be fixed, predetermined, randomly determined, determined from a table or otherwise suitably determined. Thus, each time a player selects a selection symbol, the move specification associated with that selection symbol may be the same or may be different. This adds fun and excitement to the game, because the player does not know how many positions the reel will move and also cannot see the upcoming values of the positions. This combination of unknowns is fun and exciting for the player.

As further illustrated in FIG. 4, the symbols 120*b* can include symbols other than values. In this example, symbol 125 is a “T” which represents termination. If mechanical reel 114*b* stops with symbol 125 displayed at the window 122*b*, the primary game automatically terminates. It should be appreciated that the mechanical award indicator in the gaming device of the present invention can include any suitable type of symbol which, when reached by a player, causes the gaming device to perform any predetermined event. For example, certain symbols, when reached by a player, may result in a predetermined movement of the mechanical reel or wheel, a predetermined bonus award or value, a predetermined opportunity to gain a bonus award or value, or a predetermined penalty, such as the loss of available inputs, value or credits.

Figure 5:
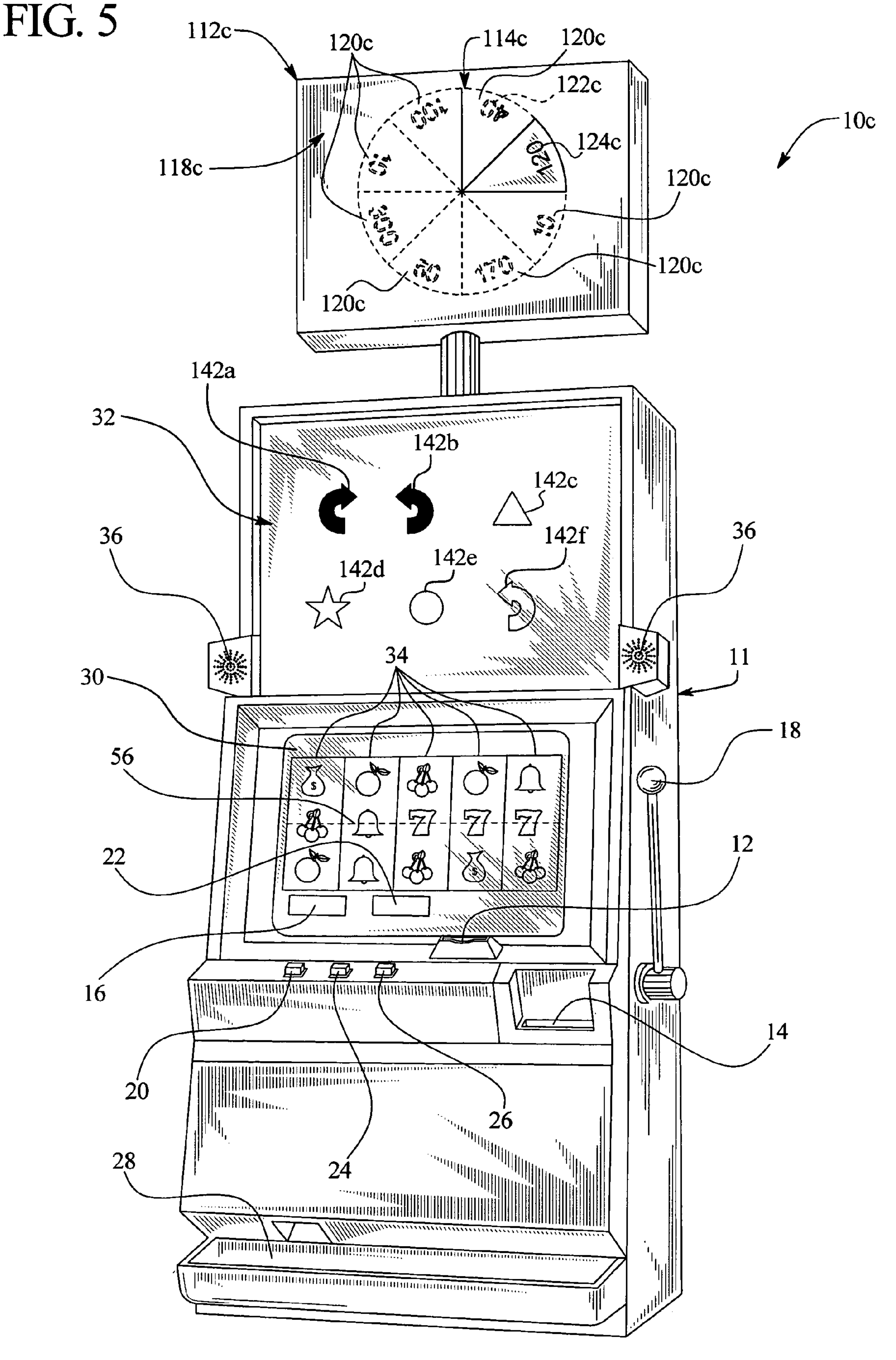
FIG. 5 is a perspective view of one embodiment of the gaming device of the present invention illustrating a plurality of reels in a primary game, a plurality of selection symbols in a bonus game and a top mounted mechanical wheel revealing one bonus value.

In one embodiment illustrated in FIG. 5, gaming device 10*c* includes an award indicator 112*c* mounted on the top portion of the cabinet 11. The award indicator 112*c* includes: (a) a mechanical wheel 114*c* coupled to and driven by a motor (not shown); and (b) a panel or mask 118*c* which preferably overlays the mechanical wheel 114*c*. The mechanical wheel 114*c* is preferably orientated such that the axis of mechanical wheel 114*c* extends into the gaming device 10*c*. The mechanical wheel 114*c* includes a plurality of bonus symbols 120*c*. Bonus symbols 120*c* are preferably bonus values. The mask 118*c* covers mechanical wheel 114*c* and includes a window 122*c*, preferably transparent or translucent, which enables the player to view the symbol 124*c* which is located behind that window 122*c*.

In operation, while playing the primary game, a player reaches a bonus triggering event displayed at the display device 30. The display device 32 then displays a plurality of selection symbols 142*a* to 142*f*. A move specification is associated with each of the selection symbols 142*a* to 142*f*. The player may then push a button 120 to select one of the selection symbols 142*a* to 142*f*. The gaming device processor causes the motor to rotate the mechanical wheel 114*c* in accordance with the move specification associated with the selected selection symbol 142*a* to 142*f*. During rotation, the player only sees one of the bonus values 120*c* at a time, as each value passes under window 122*c*. In one embodiment, the gaming device 10*c* stops the wheel 114*c* at a predetermined stop location and displays a value 124*c* through the window 122*c*. In one embodiment, the player gets such value. In another embodiment, the gaming device 10*c* gives the player the option of accepting this value or rotating the wheel 114*c* for another value. This process repeats itself a predetermined number of times or until a predetermined event occurs. When the player finally accepts or otherwise receives one or more values, the gaming device enables the player to play the primary game again, or the gaming device provides the player with the gained values and then terminates the bonus game.

Figure 6:
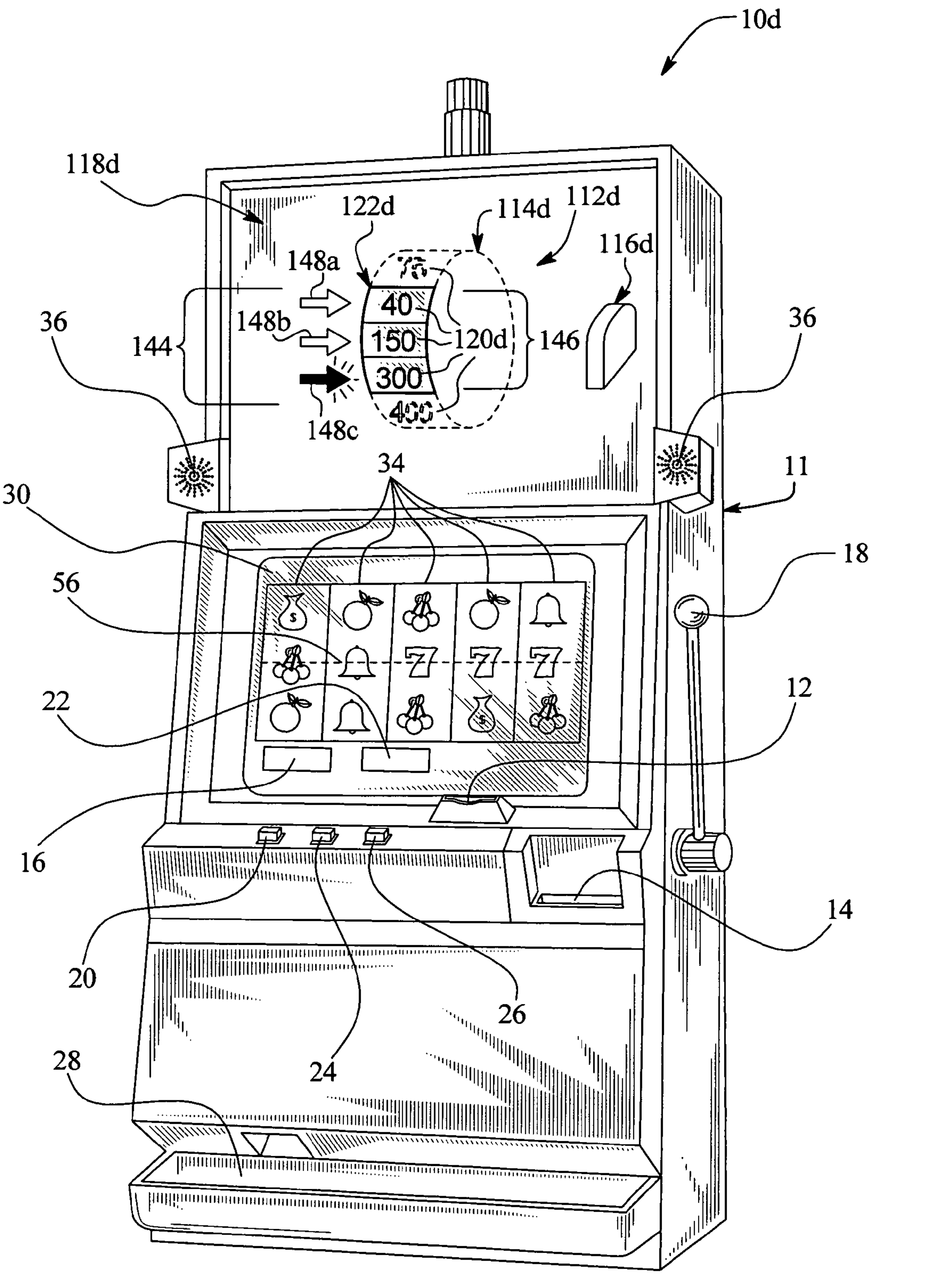
FIG. 6 is a perspective view of one embodiment of the gaming device of the present invention illustrating a plurality of reels in a primary game, a mechanical reel revealing one of a plurality of sets of values and an award indicator.

In another embodiment illustrated in FIG. 6, the gaming device 10*d* includes the mechanical award indicator 112*d*. The mechanical award indicator 112*d* includes: (a) a mechanical reel 114*d* which is coupled to and driven by a motor 116*d*; (b) a cover or mask 118*d* which displays select portions of the mechanical reel 114*d*; and (c) an indicator 144 which indicates certain symbols 120*d* on the mechanical reel 114*d*. A plurality of symbols 120*d* (preferably bonus values) are affixed to or otherwise displayed on the mechanical reel 114*d*. The mask 118*d* is connected to the cabinet 111 of the gaming device 10*d*. The mask 118*d* covers the mechanical award indicator 112*d* and includes a window 122*d* which is preferably transparent. The mask 118*d* enables the player to view a set 146 of symbols 120*d* at one time. In the example shown in FIG. 6, window 122*d* enables the player to view three bonus values (forty, twenty-five and three-hundred) at one time. In an example not illustrated in FIG. 6, the mask 118*d* includes separate windows, one for each displayed symbol.

Indicator 144 indicates predetermined bonus values 120*d* in the set 146 to the player. Preferably, indicator 144 includes a plurality of light sources or lamps 148*a*, 148*b* and 148*c* extending through the mask 118*d*. Each lamp is preferably mounted adjacent to one of the bonus symbols 120*a* displayed through the window 122*d*. In the example illustrated in FIG. 6, the lamps 148*a* to 148*c* have an arrow shape. In this example, the gaming device is indicating to the player, the bonus value 120*d* in the amount of three hundred by illuminating lamp 148*c*. It should be appreciated that the gaming device can include any suitable indicator or device which is suitable for identifying to a player one or more bonus symbols 120*d*. Suitable indicators can be affixed to or displayed on the mask 118*d* or reel 114*d*. Such indicators can include electrical lighting, sound effects or predetermined sound recordings, or video-based imaging which interfaces with the mechanical reel 114*d*.

In operation of gaming device 10*d*, when the player reaches a predetermined event during a primary game, the bonus game begins. The player may cause the mechanical reel 112*d* to rotate by making a predetermined input. Alternatively, the gaming device processor may automatically cause the mechanical reel 112*d* to rotate. In either case, when the mechanical reel 112*d* stops rotating, the gaming device displays a pool or set 146 of bonus symbols 120*d* to the player through window 122*d*. It is preferable that the bonus symbols 120*d* are bonus values.

In one embodiment, the gaming device 10*d* automatically indicates one of the bonus values 120*d* in the set 146 and awards this bonus value to the player. In another embodiment, prior to indicating one of the bonus values 120*d* in the set 146, the gaming device enables the player to accept or reject this predetermined set 146. If the player rejects this set 146 of bonus values 120*d*, the mechanical reel 120*d* rotates again, stops and displays another set 146 of bonus values 120*d* to the player. The player may accept or reject this set of bonus values 120*d*. This process may repeat itself a predetermined number of times. If the player accepts a particular set 146 of bonus values, the gaming device automatically indicates one of the bonus values within that set and awards that bonus value to the player. When a termination event occurs, such as the player accepting or rejecting a predetermined number of sets, the bonus game terminates. Upon termination of the bonus game, the gaming device awards the player with any bonus values the player has accumulated.

In one alternative embodiment of the present invention, the gaming device enables the player to control the number of symbols which pass through the window before the mechanical reel stops rotating. For example, the player can use the input button to make a desired or predetermined move specification. A move specification can specify the magnitude of rotational movement for the reel and/or the rotational direction of the reel. Preferably, in this embodiment the symbols or values on the reel are displayed through electrical lighting which the gaming device controls. This prevents players from memorizing symbol locations and controlling their payout by controlling the reel movement. It is thus preferable that the gaming device changes the values following each rotation made by a player.

In the embodiments illustrated above, the mechanical award indicator includes a mechanical reel. It should be appreciated, however, that the mechanical award indicator can include various rotatable mechanical objects other than a wheel or reel, including without limitation, objects of hexagonal, cubic, spherical, triangular, oval, square, star and other suitable polygonal shapes.

The gaming device 10 can be manufactured in any suitable manner. The actuators or motors 116*a*, 116*b* and 116*d* are generally referred to as motor 116; rotatable mechanical objects 114*a*, 114*b*, 114*c* and 114*d* are generally referred to as rotatable mechanical object 114; masks 118*a*, 118*b*, 118*c* and 118*d* are generally referred to as mask 118; award symbols 120*a*, 120*b*, 120*c*, and 120*d* are generally referred to as award symbols 120; and windows 122*a*, 122*b*, 122*c* and 122*d* are generally referred to as window 122. In one embodiment, gaming device 10 can be manufactured by: (a) assembling the gaming device cabinet 11; (b) connecting at least one suitable motor support member (not shown) to the gaming device cabinet 11; (c) connecting a motor 116 to the motor support member; (d) coupling a rotatable mechanical object 114 to the motor 116, wherein the rotatable mechanical object 114 has a plurality of award symbols 120; (e) connecting a mask 118 to the cabinet 11 over at least part of the rotatable mechanical object 114 so that the mask 118 defines at least one window 122; (f) connecting at least one suitable display device support member to the cabinet; (g) connecting at least one display device 130 or 132 to the display device support member; (h) electrically or electronically connecting at least one processor 138 to the display device 130 or 132; and (i) electrically or electronically connecting at least one memory device 140 to the processor 138.

In order to manufacture the embodiments illustrated in FIGS. 1 to 5, one must also: (a) store selection symbol data in the memory device 40 wherein the selection symbol data represents a plurality of graphical selection symbols; (b) store move specifications in the memory device 40, wherein each of the move specifications is associated with one of the graphical selection symbols; (c) connect at least one suitable input device support member (not shown) to the cabinet 11; and (d) connect at least one input device, such as input device 20, to the input device support member which enables the player to select the selection symbols.

The gaming device of the present invention, in one embodiment, includes a rotatable mechanical award indicator covered by a mask. The mask reveals a limited number of award symbols on the mechanical award indicator. In one embodiment, the gaming device enables the player to accept or reject certain award symbols or award symbols sets revealed by the mask. In another embodiment, the gaming device enables the player to affect to what extent or in what direction the mechanical award indicator rotates by selecting one of a plurality of selection symbols. This type of gaming device increases the excitement and entertainment experienced by gaming device players.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention claimed is:

1. A gaming device comprising:

a cabinet;

at least one actuator supported by the cabinet;

a rotatable mechanical object operatively coupled to the actuator, the rotatable mechanical object having a plurality of award symbols, each award symbol associated with a different stop position on the rotatable mechanical object;

a mask connected to the cabinet, the mask covering at least part of the rotatable mechanical object and defining at least one window;

a plurality of selection symbols, each selection symbol associated with a plurality of move specifications, each move specification corresponding to a rotation of the mechanical object through a number of stop positions, wherein the number of stop positions is different for at least two of the move specifications, and each move specification is associated with one of the selection symbols based on probabilities associated with said move specification;

at least one memory device which stores the move specifications and the probabilities associated with said move specifications;

a display device operable to displays the selection symbols to a player;

an input device which enables the player to select the selection symbols; and at least one processor operable with the actuator, the memory device, the display device and the input device.

2. The gaming device of claim 1, wherein the rotatable mechanical object is movable to a position so that at least one of the award symbols is adjacent to the window.

3. The gaming device of claim 1, wherein at least one of the selection symbols includes a symbol which indicates direction.

4. The gaming device of claim 1, wherein each of the move specifications is associated with a different probability.

5. The gaming device of claim 1, wherein each of the award symbols include an award value.

6. The gaming device of claim 5, wherein at least one of the award values is a bonus value.

7. The gaming device of claim 1, wherein the rotatable mechanical object includes a reel.

8. The gaming device of claim 1, which includes at least one move indicator displayed on the display device after the player selects one of the selection symbols.

9. The gaming device of claim 1, which includes an award associated with each of the award symbols.

10. The gaming device of claim 9, which includes an input for accepting or rejecting at least one of the awards.

11. The gaming device of claim 1, which includes at least one primary game.

12. The gaming device of claim 11, wherein the primary game includes the selection symbols.

13. The gaming device of claim 11, which includes at least one bonus game, wherein the bonus game includes the selection symbols.

14. The gaming device of claim 1, which includes a plurality of light sources connected to the rotatable mechanical object, each of the light sources forming one of the award symbols.

15. The gaming device of claim 14, wherein each of the selection symbols includes a move indicator displayed on the display device.

16. A gaming device comprising:

a cabinet;

at least one actuator supported by the cabinet;

a rotatable mechanical object operatively coupled to the actuator, the rotatable mechanical object having a plurality of award symbols, each award symbol associated with a different stop position on the rotatable mechanical object;

a mask connected to the cabinet, the mask covering at least part of the rotatable mechanical object and defining at least one window which reveals one of a plurality of sets of the award symbols;

at least one award symbol indicator connected to the cabinet;

an award associated with each of the award symbols;

at least one processor operable with the actuator and the display device, to:

enable a player to cause the rotatable mechanical object to move relative to the mask a number of stop positions according to one of a plurality of different move specifications, based on a plurality of different probabilities associated with the different move specifications, wherein the number of stop positions associated with a move specification is different for at least two of the move specifications.

17. The gaming device of claim 16, which includes an input device in communication with the processor which enables a player to accept the set or reject the set, causing the rotatable mechanical object to rotate to a stop position where the window reveals a different set to the player.

18. The gaming device of claim 16, which includes a game event associated with an initiation of rotation of the rotatable mechanical object.

19. The gaming device of claim 16, which includes an input device which enables a player to initiate rotation of the rotatable mechanical object.

20. The gaming device of claim 16, which includes a plurality of award symbol indicators, each of the award symbol indicators having a position adjacent to one of the award symbols in the revealed set.

21. The gaming device of claim 16, wherein the award symbol indicator includes at least one light source.

22. The gaming device of claim 16, wherein each of the award symbols in each of the sets is associated with a probability.

23. The gaming device of claim 16, wherein each of the award symbols include an award value.

24. The gaming device of claim 23, wherein at least one of the award values is a bonus value.

25. The gaming device of claim 16, wherein the rotatable mechanical object includes a reel.

26. A method for indicating an award to a player in a gaming device having a game operable upon a wager, said method comprising:

(a) providing a mechanical object rotatably connected to a cabinet of the gaming device;

(b) providing a plurality of award symbols on the rotatable mechanical objects, each award symbol associated with a different position on the mechanical object;

(c) providing a window adjacent to the mechanical object which reveals at least one of the award symbols to a player at a point in time;

(d) displaying a plurality of selection symbols;

(e) enabling a player to select at least one of the selection symbols, wherein different move specifications corresponding to a rotation of the mechanical object through a number of positions are associated with at least two different selection symbols based on probabilities associated with said move specifications;

(f) rotating the mechanical object to a position based on which selection symbol the player selects; and (g) revealing at least one of the award symbols through the window.

27. The method of claim 26, which includes providing the player with an award associated with the revealed award symbol.

28. The method of claim 26, which includes providing the player with an award associated with the revealed award symbol and repeating steps (d) through (g) at least once.

29. The method of claim 26, which includes enabling the player to accept or reject an award associated with the revealed award symbol.

30. The method of claim 26, which includes enabling the player to accept or reject an award associated with the revealed award symbol and repeating steps (d) through (g) at least once if the player rejects the award associated with the revealed award symbol.

* * * * *